(12) United States Patent
Ikuma et al.

(10) Patent No.: US 6,997,157 B2
(45) Date of Patent: Feb. 14, 2006

(54) DUAL PORT INTAKE DEVICE FOR AN INTERNAL COMBUSTION ENGINE FORMED BY INJECTION MOLDING

(75) Inventors: Tomonori Ikuma, Saitama (JP); Kazuyori Kito, Kanagawa (JP)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 10/866,165

(22) Filed: Jun. 14, 2004

(65) Prior Publication Data

US 2005/0016487 A1    Jan. 27, 2005

(30) Foreign Application Priority Data

| Jun. 13, 2003 | (JP) | ............................. 2003-168899 |
| Jun. 13, 2003 | (JP) | ............................. 2003-168909 |
| Jun. 13, 2003 | (JP) | ............................. 2003-168914 |

(51) Int. Cl.
*F02M 35/10* (2006.01)

(52) U.S. Cl. ........................... 123/184.53; 123/184.61; 123/184.42; 123/184.43; 123/184.44; 123/185.12; 123/184.21

(58) Field of Classification Search ........... 123/184.53, 123/184.42, 184.43, 184.44, 184.21, 184.22, 123/185.12, 184.61, 188.1
See application file for complete search history.

(56) References Cited

U.S. PATENT DOCUMENTS 6,427,655 B2 *   8/2002   Itoh et al. .............. 123/184.42

FOREIGN PATENT DOCUMENTS

| JP | 3-41056 | 8/1991 |
| JP | 2001-342918 | 12/2001 |

* cited by examiner

*Primary Examiner*—Tony M. Argenbright
*Assistant Examiner*—Johnny H. Hoang
(74) *Attorney, Agent, or Firm*—Squire, Sanders & Dempsey LLP

(57) ABSTRACT

The intake manifold assembly comprises three blocks each molded from a plastic material by injection molding, the three blocks consisting of a first block defining a half of the surge tank, a second block defining a half of the individual intake pipes and a third block defining a remaining half of the surge tank and a remaining half of the individual intake pipes. Thereby, the intake manifold assembly may be provided with various features for defining a pair of intake pipe sections arranged in a mutually parallel relationship while being made to be suitable for an injection molding process. Because the surge tank are defined by the first and third blocks while the individual intake pipes are defined by the second and third blocks, the intake manifold assembly essentially consisting of three blocks can internally define essential features required for a dual port intake device without requiring additional component members.

13 Claims, 7 Drawing Sheets

DUAL PORT INTAKE DEVICE FOR AN INTERNAL COMBUSTION ENGINE FORMED BY INJECTION MOLDING

TECHNICAL FIELD

The present invention relates to a dual port intake device for an internal combustion engine provided with a pair of intake pipe sections arranged in a mutually parallel relationship for each cylinder, and in particular to a dual port intake device for an internal combustion engine adapted to be formed by injection molding a plastic material.

BACKGROUND OF THE INVENTION

There have been a number of proposals to form an intake manifold by molding plastic material primarily for the purpose of minimizing the weight of the engine. For instance, Japanese patent laid open publication (kokai) No. 2001-342918 discloses an intake manifold consisting of two pieces that are bonded to each other along a plane in parallel with the direction of the intake flow to define individual intake pipes that are commonly connected to a surge tank.

A number of dual port intake manifolds have also been proposed. According to the proposal disclosed in Japanese utility model publication (kokoku) H03-41056, each individual intake pipe includes a pair of intake pipe sections having different lengths branching off from the surge tank and connected to a same cylinder in a mutually parallel relationship and a butterfly valve for selectively closing one of the intake pipe sections depending on the load condition of the engine for the purpose of optimizing the intake volumetric efficiency of the engine over a wide operating range of the engine.

However, the aforementioned proposal to form an intake manifold by injection molding plastic material is not suitable for molding an intake manifold having a more complex configuration as is the case when the intake manifold is to be used as a part of a dual port intake device because of the limited freedom in design. In particular, the bearing arrangement for the selection valve for selectively closing one of the intake pipe sections tends to complicate the structure of the intake manifold.

Also, the selection valve for a dual port intake device is typically actuated by a vacuum actuator, and a negative pressure chamber for storing intake negative pressure is required. The need for a negative pressure chamber and the piping for communicating the negative pressure source to the negative pressure chamber and vacuum actuator also adds to the complexity of the intake device.

BRIEF SUMMARY OF THE INVENTION

In view of such problems of the prior art, a primary object of the present invention is to provide an improved dual port intake device for an internal combustion engine which is adapted to be manufactured by injection molding plastic material.

A second object of the present invention is to provide an improved dual port intake device for an internal combustion engine which is simple and compact in structure.

A third object of the present invention is to provide an improved dual port intake device for an internal combustion engine including a negative pressure chamber provided integrally and internally in the intake manifold assembly for storing negative pressure for a vacuum actuator in a highly space saving manner.

A fourth object of the present invention is to provide an improved dual port intake device for an internal combustion engine which is provided with an intake manifold assembly having a curvature centered around a point on a side of the engine and allows an overall profile of the engine and intake device to be confined to a limited volume.

At least some of these objects of the present invention can be accomplished by providing an intake device for an internal combustion engine having an in-line cylinder bank, comprising: an intake manifold assembly defining a surge tank adjacent to a throttle valve end of the assembly and a plurality of individual intake pipes each including a pair of intake pipe sections branching off from each other and leading to a cylinder head end of the assembly; a selection valve rotatably supported by a selection valve supporting portion in one of the two intake pipe sections of each individual intake pipe for selectively closing the corresponding intake pipe section; and a vacuum actuator provided adjacent to the intake manifold assembly for actuating the selection valve by selectively supplying intake negative pressure thereto; wherein the intake manifold assembly comprises at least three blocks each molded from a plastic material by injection molding, the three blocks consisting of a first block defining a half of the surge tank, a second block defining a half of the individual intake pipes and a third block defining a remaining half of the surge tank and a remaining half of the individual intake pipes.

The intake pipe sections branching off from each other typically run substantially in parallel to each other, and merge with each other at the downstream ends thereof.

By thus forming the intake manifold assembly from the three blocks arranged and distributed in a favorable manner, the intake manifold assembly may be provided with various features for defining a pair of intake pipe sections arranged in a mutually parallel relationship while being made to be suitable for an injection molding process. In particular, each block may be given with a relatively simple shape which is suited to be molded by using a relatively simple molding die assembly that may include cores in addition to die members for defining the outer shape of the molded product.

Because the surge tank is defined by the first and third blocks (optionally with the aid of the second block) while the individual intake pipes are defined by the second and third blocks (optionally with the aid of the first block), the intake manifold assembly essentially consisting of three blocks can internally define essential features required for a dual port intake device without requiring additional component members. If necessary, each block may consist of a plurality of sub blocks without departing from the spirit of the present invention.

According to a preferred embodiment of the present invention, the intake device may extend along the outer contour of the engine so as to allow the engine assembly including the intake device to be fitted into a limited space. In such an embodiment, a downstream end of each individual intake pipe comprises an elbow section having an open outlet end defined by the third block in a plane extending substantially in parallel with a cylinder axial line and a lengthwise direction of the in-line cylinder bank, and an upstream end of the surge tank comprises an elbow section having an open inlet end defined by the first block in a plane extending substantially in parallel with a plane defined by a cylinder axial line and a lengthwise direction of the in-line cylinder bank.

The vacuum actuator may comprise a housing part which is integrally molded with a part of the intake manifold assembly such as the third block thereof so that this feature also may be integrally formed with the intake manifold assembly so as to eliminate a need for an additional component part. Such a vacuum actuator requires a solenoid valve for controlling the supply of negative pressure to the vacuum actuator, but the need for additional components can be minimized in this case also by integrally molding a stay member for supporting the solenoid valve with a part of the intake manifold assembly adjacent to the vacuum actuator.

The intake manifold assembly may further define a negative pressure chamber and a communication passage communicating the negative pressure chamber with the surge tank for minimizing the need for external or additional components. In such a case, a check valve may be fitted in the communication passage for storing negative pressure in the negative pressure chamber. Also, the support portion for rotatably supporting the selection valve may be provided in the intake manifold assembly, preferably between the first and third blocks thereof.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
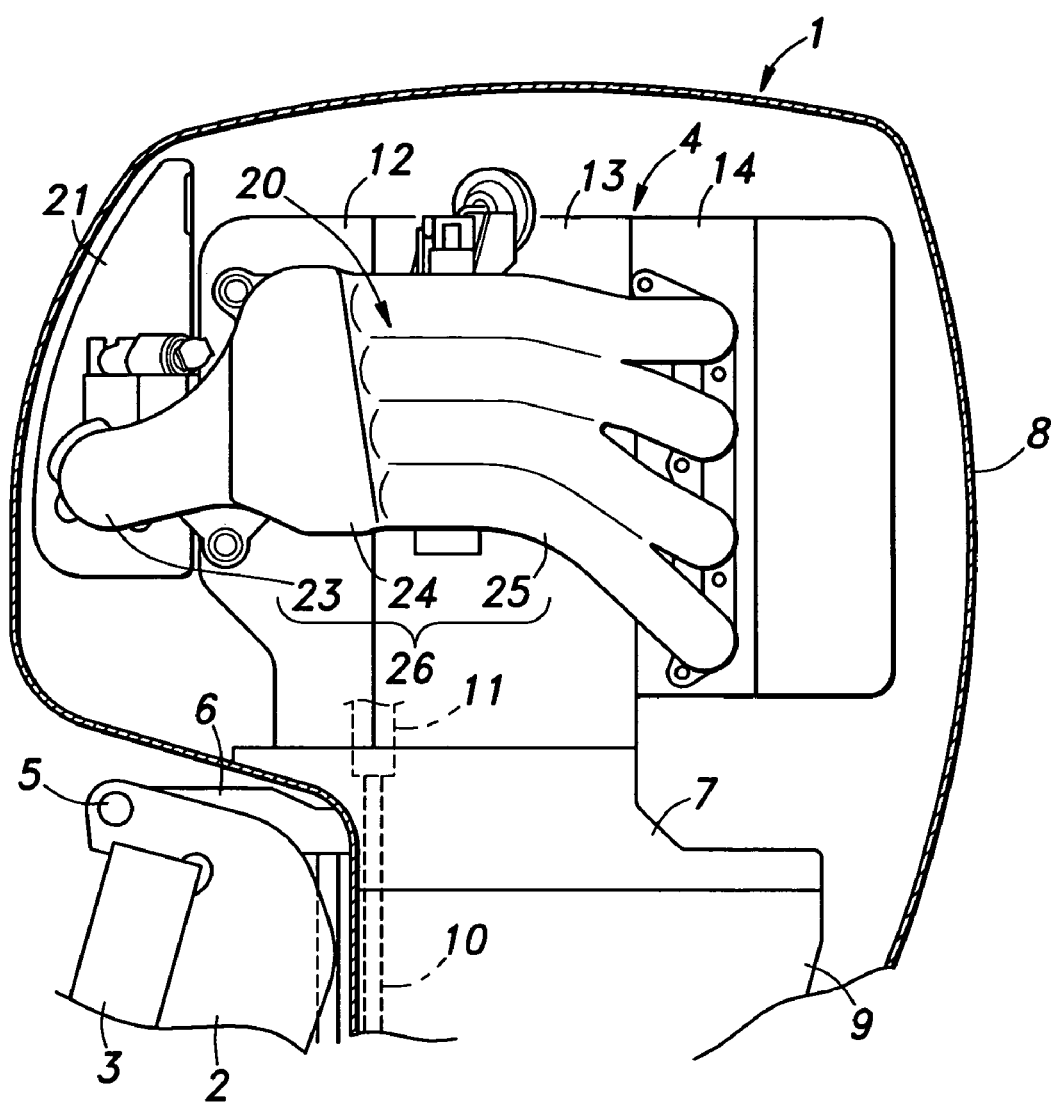
FIG. 1 is a side view partly in section showing an outboard motor provided with an intake device embodying the present invention.
Figure 2:
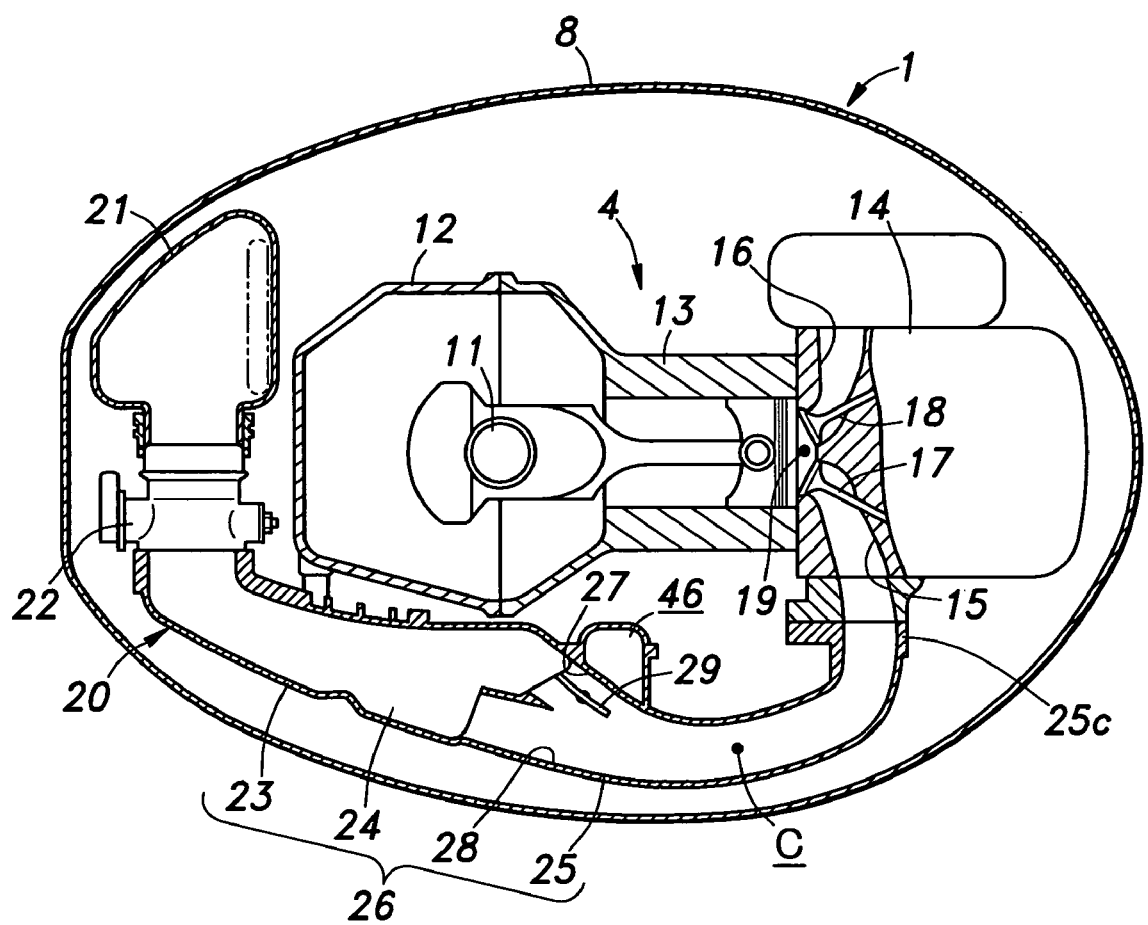
FIG. 2 is a sectional plan view of the outboard motor.

FIGS. 1 and 2 show an engine of an outboard motor. This outboard motor 1 is of a per se known type adapted to be attached to a stern board 3 via a stern bracket 2 except for the novel arrangement for the intake device. The engine 4 of this outboard motor 1 is mounted on a mount case 7, and the mount case 7 is substantially integrally provided with a swivel case 6 which is in turn connected to the stem bracket 2 so as to be freely vertically rotatable around a tilt shaft 5 extending horizontally. The engine 4 which is mounted on the mount case 7 is substantially entirely covered by a detachable engine cover 8.

The mount case 7 is connected to an upper end of an extension case 9, and a drive shaft 10 extending to a screw propeller (not shown in the drawings) is connected to a crankshaft 11 of the engine 4 in the mount case 7.

The engine 4 consists of an in-line four-cylinder vertical crankshaft engine, for instance, and comprises a crankcase 12, a cylinder block 13 and a cylinder head 14. The engine 4 is oriented with respect to the boat so that the crankcase end of the engine 4 is directed forward. The cylinder head 14 defines combustion chambers 19 which are each selectively communicated with an intake port 15 and an exhaust port 16 via an intake valve 17 and exhaust valve 18, respectively (see FIG. 2).

An intake device 20 is provided opposite to a side (portside) surface of the engine defined by the crankcase 12, cylinder block 13 and cylinder head 14. The intake device 20 comprises an intake muffler chamber 21 and a throttle body 22 provided opposite to the forward end surface of the crankcase 12 and an intake manifold assembly 26 provided opposite to the portside surface of the engine. The intake manifold assembly 26 includes an elbow section 23 connected to an outlet end of the throttle body 22a, surge tank portion 24 continuously extending from the elbow section 23 and individual intake pipes 25 each branching off from the surge tank portion 24 and individually connected to the intake port 15 of a corresponding one of the cylinders. This intake device 20 is attached to the engine 4 by securing the surge tank portion 24 to a side face of the crankcase 12 by threaded fasteners and the downstream end of each individual intake pipe 25 to a side face of the cylinder head 14 also by threaded fasteners.

The individual intake pipes 25 are arranged one next to another along the length of the cylinder bank on one side (portside) of the cylinder block 13, and the upstream end of each individual intake pipe 25 adjacent to the surge tank portion 24 includes a short intake pipe section 27 located adjacent to the engine and a long intake pipe section 28 located remote from the engine in a mutually parallel relationship. These two pipe sections 27 and 28 commonly merge into a common pipe section C in the downstream end of the corresponding individual intake pipe 25, and each individual intake pipe 25 further extends to a connecting end 25c that is connected to the cylinder head 14. Each short pipe section 27 is provided with a butterfly valve 29 which moves jointly with the other butterfly valves 29 provided in the short pipe sections 27 of the other individual intake pipes 25.

Figure 3:
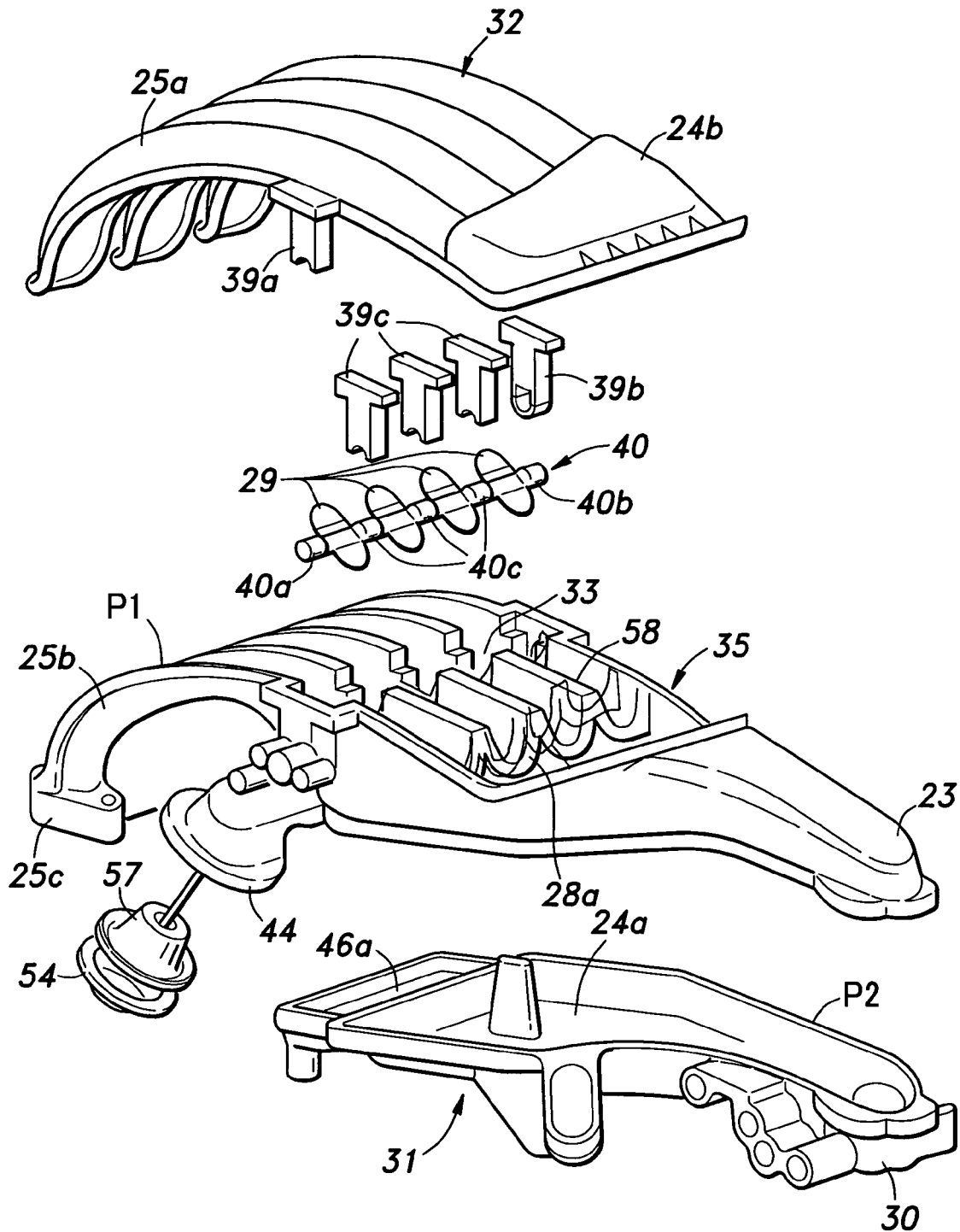
FIG. 3 is an exploded perspective view of the intake manifold assembly.
Figure 4:
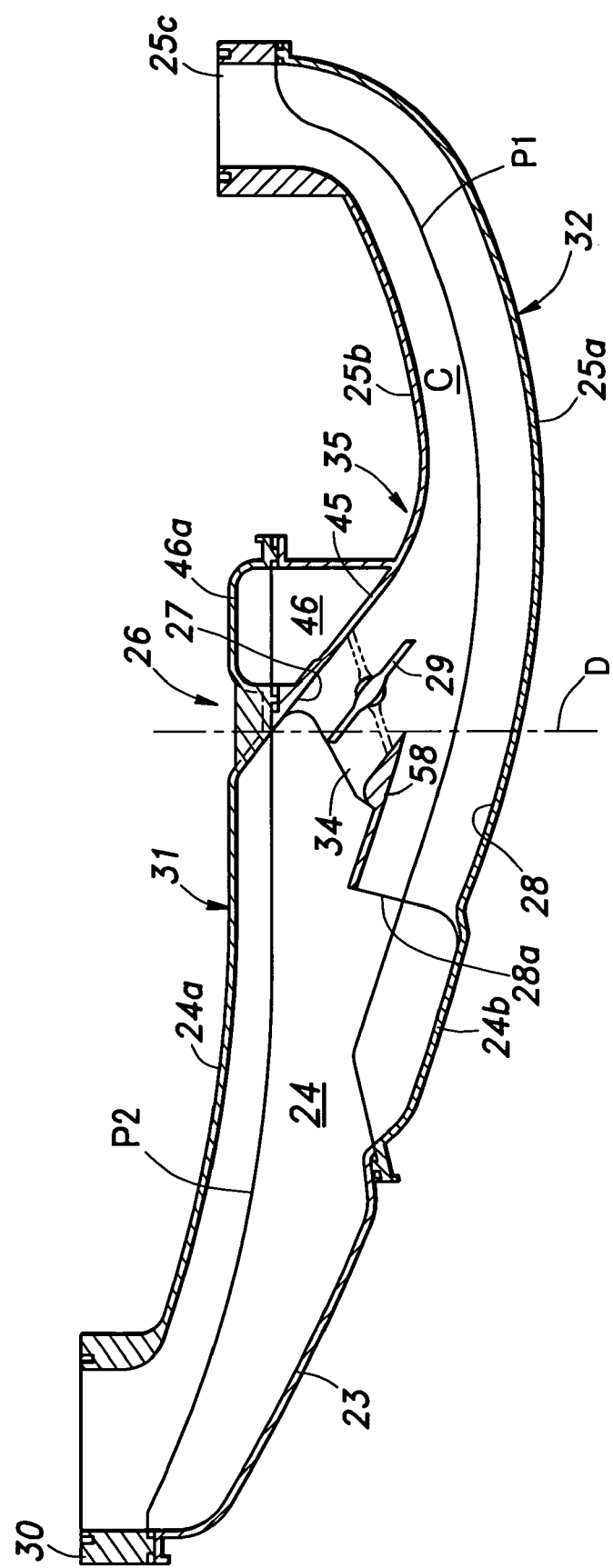
FIG. 4 is a sectional side view of the intake manifold assembly.

The intake manifold assembly 26 consists of three blocks as illustrated in FIG. 3. Each block is configured in such a manner that the individual intake pipes 25 each including the short intake pipe section 27 and long intake pipe section 28 arranged in parallel to each other in an intermediate part thereof and the surge tank portion 24 can be molded by using metallic die assemblies each essentially consisting of two pieces. As illustrated in FIG. 4, the first block or the inner block 31 includes a throttle body mounting portion 30 and a wall 24a of the surge tank portion 24 facing the engine, the second block or the outer block 32 includes an outer half 25a of each individual intake pipe 25 having a parting plane PI curving around a point on the side of the engine at a certain curvature along the flow line of the intake flow and a wall 24b of the surge tank 24 facing away from the engine, and the third block or the intermediate block 35 includes an inner half 25b of each individual intake pipe 25, an end portion 25c of each individual intake pipe 25 adjacent to the cylinder head 14, a butterfly valve support portion 33, an open upstream end of each short intake pipe section 27 and an elbow portion 23 continuing from the wall 24b of the surge tank facing away from the engine. The inner block 31 and intermediate block 35 are separated from each other along a parting plane P2 extending substantially in parallel with the wall 24a of the surge tank portion 24 facing the engine.

Figure 5:
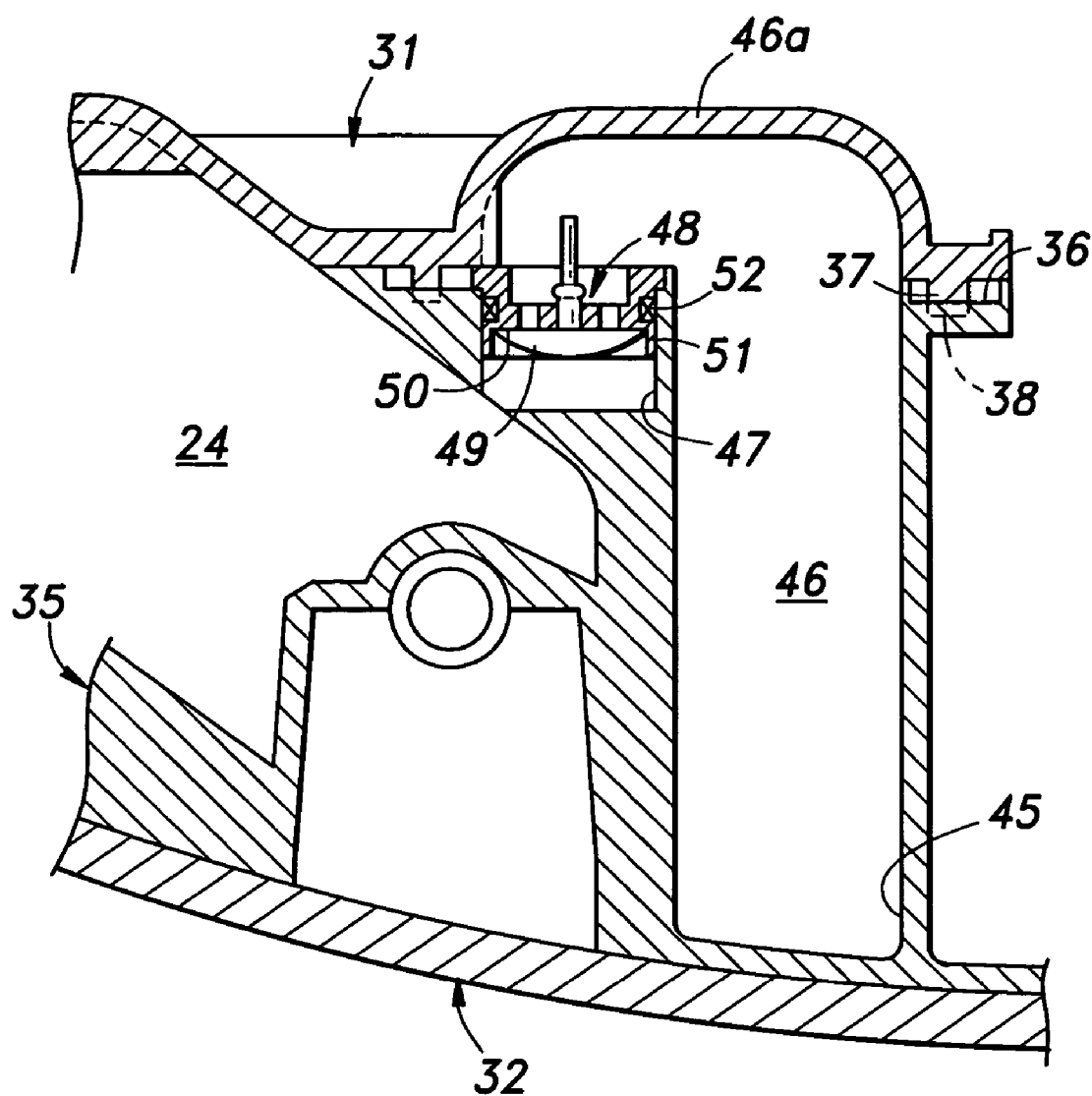
FIG. 5 is an enlarged fragmentary sectional view of a part of the intake manifold assembly.

These three blocks 31, 32 and 35 are individually molded by injection a suitable molding plastic material, and are joined to each other, for instance, by vibration welding. Each pair of the bonding surfaces of these blocks are provided with a projection 36 and a complementary recess 37, respectively, as illustrated in FIG. 5. Each projection 37 is provided with a suitable amount of overlap or excess material so that a part of the material of the projection 37 melts and fuses into the recess 37 as they are welded together.

Figure 6:
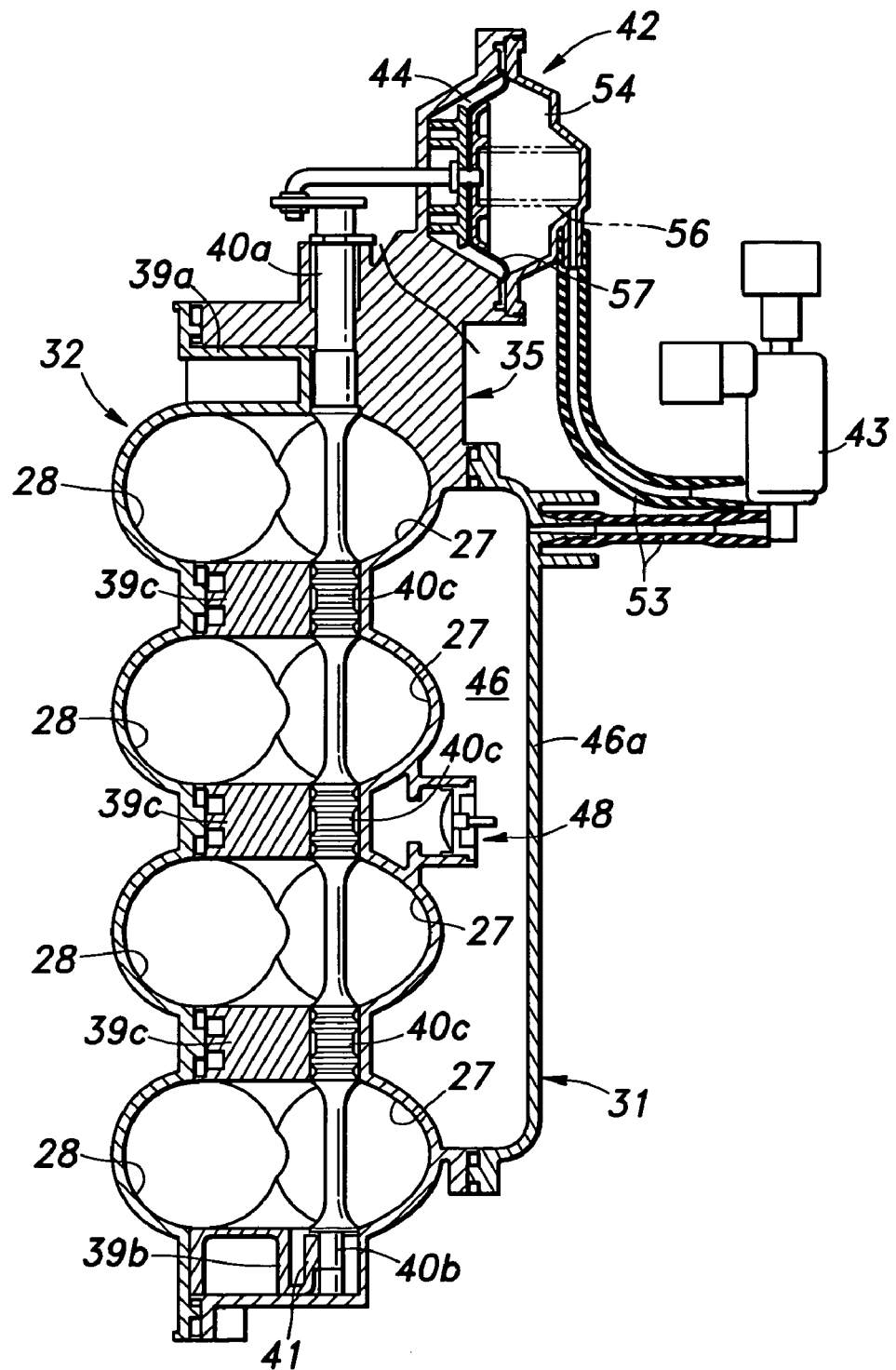
FIG. 6 is a cross sectional view of the intake manifold assembly.

Referring to FIG. 6, the four butterfly valves 29 are supported by a common shaft 40 which is rotatably supported by shaft holders 39a to 39c at two ends 40a, 40b and three intermediate parts 40c thereof. One end 40b of the shaft 40 is resiliently urged in a radial direction by a spring piece 41 provided on the corresponding shaft holder 39b (as an integrally molded piece thereof) so as to be smoothly rotatable without a play. The other shaft holder 39a integrally formed with the outer block 32 opposes the other end 40a of the shaft 40 while the three shaft holders 39c in the intermediate parts snugly receive the corresponding intermediate parts 40c of the shaft 40. The intermediate parts 40c of the shaft 40 that are journaled on the three shaft holders 39c are each provided with annular ridges so as to form labyrinth seal for preventing the leaking of intake gas between adjacent intake passages and to provide friction-free journaling of the intermediate parts 40c.

The other end 40a (upper end) of the shaft 40 for the butterfly valves 29 is connected to a per se known diaphragm actuator 42 which is adapted to be actuated by the intake vacuum. The four butterfly valves 29 are simultaneously opened and closed by intermittently actuating a solenoid valve 43 according to a prescribed control signal and thereby continually controlling the supply of the negative pressure to the diaphragm actuator 42.

Figure 8:
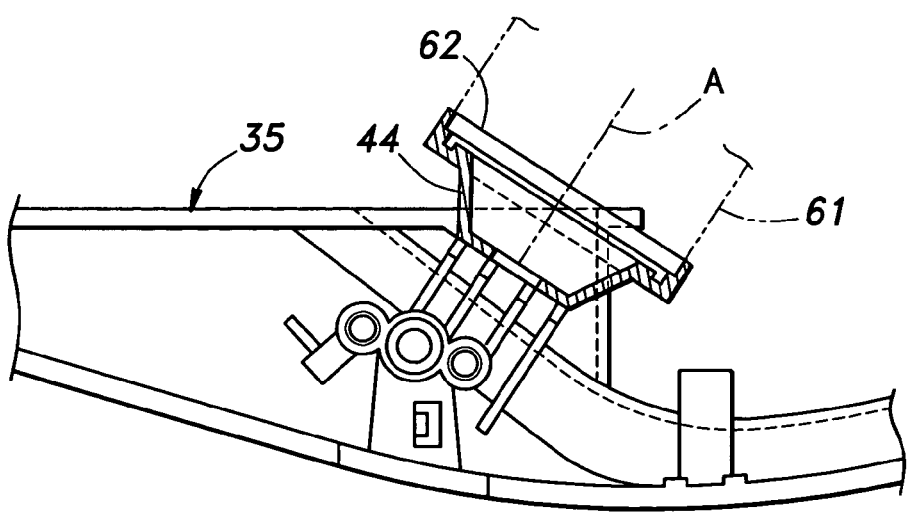
FIG. 8 is a fragmentary plan view of the intake manifold assembly showing the housing portion of the vacuum actuator integrally molded with the intake manifold assembly.

The atmospheric pressure chamber 44 of the diaphragm actuator 42 is defined by a wall portion that is integrally molded with the intermediate block 35 as illustrated in FIG. 8 so that the necessary number of component parts can be minimized.

The inner block 31 is provided with a bulge 46a adjacent to the surge tank portion 24 that defines a negative pressure chamber 46 in cooperation with a recess 45 formed in the intermediate block 35 adjacent to the butterfly valves 29 as best illustrated in FIG. 5. More specifically, the negative pressure chamber 46 is located adjacent to the butterfly valves 29 on the downstream side thereof and on the inner circumferential part of the short intake pipe section 27 on the inner circumferential part of the individually intake pipes 25 that curve around a center of curvature located on the side of the engine.

As illustrated in FIG. 5, an intermediate part of the negative pressure chamber 46 along the direction of the cylinder bank is provided with a cylindrical hole 47 having a bottom end that communicates with the surge tank 24. The cylindrical hole 47 is fitted with a negative pressure check valve 48. The negative pressure check valve 48 comprises a valve member 49 having the shape of an inverted mushroom and made of relatively soft plastic material, and a valve support member 51 retaining the valve member 49 so as to be axially moveable by a prescribed stroke and formed with a valve seat 50 that cooperates with the valve member 49. The valve support member 51 is fitted into the cylindrical hole 47 via a seal member 52 such as an O-ring.

Thus, a large part of the negative pressure chamber 46, surge tank 24 and cylindrical hole 47 communicating these parts together and fitted with the negative pressure check valve 48 is integrally molded with the intermediate block 35 that forms the intake manifold assembly 26. For this reason, no separate piping is required for conducting the intake negative pressure to the negative pressure chamber 46.

The negative pressure valve 48 operates as follows. As the negative pressure in the individual intake pipes 25 increases, the valve member 49 is drawn toward the individual intake pipes 25 and moves away from the valve seat 50 with the result that the negative pressure prevails in the negative pressure chamber 46. As the negative pressure in the individual intake pipes diminishes, the valve member 49 is urged against the valve seat 50 so that the negative pressure in the negative pressure chamber 46 is kept at the high level.

Figure 7:
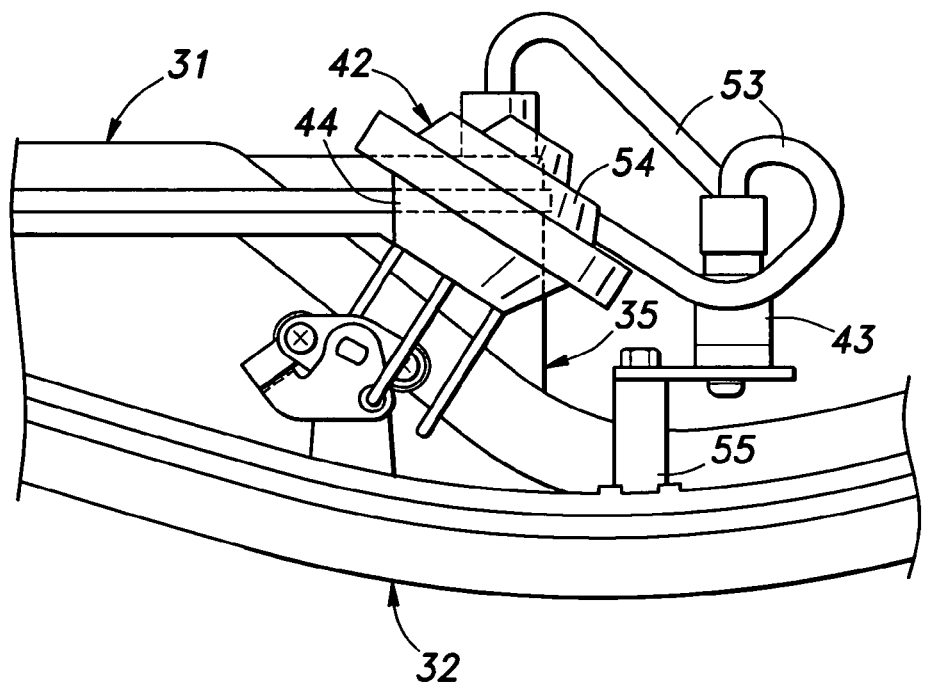
FIG. 7 is a fragmentary plan view of the vacuum actuator and the surrounding part of the intake manifold assembly.

The negative pressure chamber 46 is connected to the negative pressure chamber 54 of the diaphragm actuator 42 via the solenoid valve 43 and rubber tubes 53 as best illustrated in FIG. 7 so that the communication between the negative pressure chamber 54 of the diaphragm actuator 42 and negative pressure chamber 46 is selectively established by turning on and off the solenoid valve 43. The solenoid valve 43 is attached to a stay portion 55 integrally formed on a side face of the intermediate block 35 adjacent to the atmospheric pressure chamber 44 of the diaphragm actuator 42 by using threaded fasteners. Also owing to the fact that the negative pressure chamber 46 is provided adjacent to the butterfly valve support portion 33, the lengths of the rubber tubes 53 that connect the negative pressure chamber 46, solenoid valve 43 and negative pressure chamber 54 of the diaphragm actuator 42 can be reduced even further.

Thus, when the diaphragm 57 is pushed toward the atmospheric pressure chamber 44 by the compressed coil spring 56 compressed in the negative pressure chamber 54 of the diaphragm actuator 42, the butterfly valves 29 are open and the short pipe sections 27 leading to the cylinder head ends 25c from the open ends 34 immediately adjacent to the butterfly valves 29 communicate with the intake upstream ends of the long pipe sections 28 (in a high speed, high load operating range). When the negative pressure is introduced into the negative pressure chamber 54 of the diaphragm actuator 42 and the diaphragm 57 is pulled toward the negative pressure chamber 54, the butterfly valves 29 are closed (as indicated by the double chain dot lines in FIG. 4), and only the long pipe sections 28 having open ends 28a that are located more upstream than the open ends 34 of the short pipe sections 27 (in a low speed, low load operating range) are in communication. In this manner, the cross sectional area and length of the individual intake pipes 25 can be changed in two stages according to the operating condition of the engine 4.

The downstream end of the pipe wall 58 that separates the upstream end of the long pipe sections 28 and short pipe sections 27 is located on a same plane D as the open end 34 of the short pipe sections 27 in the surge tank 24. This plane D as well as the axial line of the cylinder head end 25c of the individual intake pipe portion 25 extends perpendicularly to the parting plane P2 of the metallic die assembly so that the molded product may be removed from the intermediate block 35 without any problem. The axial line of the recess 45 defining the negative pressure chamber 46 and axial line of the cylindrical hole 47 fitted with the negative pressure check valve 48 also extend perpendicularly to the parting plane P2 of the metallic die assembly for the convenience of separating the intermediate block 35 from the molded product.

The central axial line A of the atmospheric chamber 44 of the diaphragm actuator 42 may tilt with respect to the direction parallel with the plane D or the direction of separating the intermediate block 35 (as shown in FIG. 8) because it is molded by using a separate slidable core 61 (indicated by the imaginary lines). It is also possible to do away with the separate slidable core 61 by directing the open end of the atmospheric chamber 44 upward in FIG. 8 and orienting the central axial line in parallel with the plane D.

Although the present invention has been described in terms of preferred embodiments thereof, it is obvious to a person skilled in the art that various alterations and modifications are possible without departing from the scope of the present invention which is set forth in the appended claims.

What is claimed is:

1. An intake device for an internal combustion engine having an in-line cylinder bank, comprising:
   an intake manifold assembly defining a surge tank adjacent to a throttle valve end of said assembly and a plurality of individual intake pipes each including a pair of intake pipe sections branching off from each other and leading to a cylinder head end of said assembly;
   a selection valve rotatably supported by a selection valve supporting portion in one of said two intake pipe sections of each individual intake pipe for selectively closing the corresponding intake pipe section; and
   a vacuum actuator provided adjacent to said intake manifold assembly for actuating said selection valve by selectively supplying intake negative pressure thereto;
   wherein the intake manifold assembly comprises at least three blocks each molded from a plastic material by injection molding, the three blocks consisting of a first block defining a half of the surge tank, a second block defining a half of the individual intake pipes and a third block defining a remaining half of the surge tank and a remaining half of the individual intake pipes.

2. An intake device for an internal combustion engine according to claim 1, wherein an upstream end of said surge tank comprises an elbow section having an open inlet end defined by said first block in a plane extending substantially in parallel with a plane defined by a cylinder axial line and a lengthwise direction of the in-line cylinder bank.

3. An intake device for an internal combustion engine according to claim 1, wherein a downstream end of each individual intake pipe comprises an elbow section having an open outlet end defined by said third block in a plane extending substantially in parallel with a plane defined by a cylinder axial line and a lengthwise direction of the in-line cylinder bank.

4. An intake device for an internal combustion engine according to claim 1, wherein said vacuum actuator comprises a housing part which is integrally molded with a part of said intake manifold assembly.

5. An intake device for an internal combustion engine according to claim 4, wherein said housing part of said vacuum actuator is integrally molded with said third block of said intake manifold assembly.

6. An intake device for an internal combustion engine according to claim 5, further comprising a solenoid valve provided in a path of supplying the negative pressure to said vacuum actuator and a stay member for supporting said solenoid valve, said stay member being integrally molded with a part of said intake manifold assembly adjacent to said vacuum actuator.

7. An intake device for an internal combustion engine according to claim 1, wherein further comprising a solenoid valve provided in a path of supplying the negative pressure to said vacuum actuator, said intake manifold assembly further defining a negative pressure chamber and a communication passage communicating said negative pressure chamber with said surge tank, a check valve being fitted in said communication passage for storing negative pressure in said negative pressure chamber.

8. An intake device for an internal combustion engine according to claim 7, wherein said negative pressure chamber is jointly defined by said first block and third block.

9. An intake device for an internal combustion engine according to claim 7, wherein said intake manifold assembly is generally provided with a curvature having a center thereof located on a side of said engine, and each of said intake pipe sections selectively closed by the corresponding selection valve is located on a side of said intake manifold assembly adjacent to said engine, said negative pressure chamber being defined immediately downstream of said selection valve on a side of said intake manifold assembly adjacent to said engine.

10. An intake device for an internal combustion engine according to claim 9, wherein said negative pressure chamber is jointly defined by said first block and third block.

11. An intake device for an internal combustion engine according to claim 9, wherein said intake pipe sections of each individual intake pipe differ in length from each other.

12. An intake device for an internal combustion engine according to claim 9, wherein a bearing portion for a shaft of said selection valves is formed between said first and third blocks.

13. An intake device for an internal combustion engine according to claim 12, further comprising a bearing member defining a semi-circular bearing surface which forms a full bearing surface for said shaft of said selection valves in cooperation with a corresponding semi-circular bearing surface formed in one of said first and third blocks.

* * * * *